(12) United States Patent
Finkelstein

(10) Patent No.: US 10,979,345 B2
(45) Date of Patent: Apr. 13, 2021

(54) REMOTE MEDIUM ACCESS CONTROL (MAC) BASED NETWORKS

(71) Applicant: Jeffrey Finkelstein, Atlanta, GA (US)

(72) Inventor: Jeffrey Finkelstein, Atlanta, GA (US)

(73) Assignee: COX COMMUNICATIONS, INC., Atlanta, GA (US)

(*) Notice: Subject to any disclaimer, the term of this patent is extended or adjusted under 35 U.S.C. 154(b) by 0 days.

(21) Appl. No.: 16/182,254

(22) Filed: Nov. 6, 2018

(65) Prior Publication Data

US 2020/0145323 A1    May 7, 2020

(51) Int. Cl.
*H04L 12/707* (2013.01)
*H04L 12/781* (2013.01)
*H04L 29/06* (2006.01)
*H04L 12/42* (2006.01)

(52) U.S. Cl.
CPC .............. *H04L 45/24* (2013.01); *H04L 12/42* (2013.01); *H04L 45/52* (2013.01); *H04L 69/14* (2013.01); *H04L 2012/421* (2013.01)

(58) Field of Classification Search
CPC ......... H04L 45/24; H04L 45/52; H04L 12/42; H04L 69/14; H04L 2012/421
See application file for complete search history.

(56) References Cited

U.S. PATENT DOCUMENTS

| | | | | |
|---|---|---|---|---|
| 2002/0191250 A1* | 12/2002 | Graves | ............... | H04Q 11/0066 398/82 |
| 2003/0063659 A1* | 4/2003 | Kaltiainen | ............... | H04L 5/023 375/222 |
| 2003/0133450 A1* | 7/2003 | Baum | ............... | H04L 29/12018 370/389 |
| 2004/0136385 A1* | 7/2004 | Xue | ............... | H04L 45/00 370/401 |
| 2004/0210420 A1* | 10/2004 | Lee | ............... | H04L 41/06 702/186 |
| 2005/0243738 A1* | 11/2005 | Zolfaghari | ............... | H04L 12/2854 370/254 |
| 2005/0286518 A1* | 12/2005 | Park | ............... | H04L 29/1282 370/389 |
| 2008/0270673 A1* | 10/2008 | Sridhar | ............... | H04L 12/2856 711/6 |
| 2009/0073886 A1* | 3/2009 | Burns | ............... | H04L 43/50 370/248 |
| 2011/0080909 A1* | 4/2011 | Ko | ............... | H04L 63/10 370/390 |
| 2011/0261828 A1* | 10/2011 | Smith | ............... | H04L 49/70 370/401 |

(Continued)

*Primary Examiner* — Stephen J Clawson
(74) *Attorney, Agent, or Firm* — Eversheds Sutherland (US) LLP

(57) ABSTRACT

Described herein include systems, methods, and apparatuses for the remote medium access control (MAC) in communication networks, for example, in cable networks. In particular, the disclosure describes a network architecture including a switch configured to communicate with remote MAC layer devices over first connections (e.g., digital fiber connections); the remote MAC layer devices configured to communicate with remote physical (PHY) layer devices over second connections (e.g., second digital fiber connections); and the remote PHY layer device configured to communicate with customer premise equipment devices over a third connection (e.g., analog coaxial connections).

16 Claims, 6 Drawing Sheets

(56) References Cited

U.S. PATENT DOCUMENTS

| | | | |
|---|---|---|---|
| 2013/0094856 A1* | 4/2013 | Chen | H04L 45/62 398/48 |
| 2014/0199077 A1* | 7/2014 | Ling | H04L 27/0002 398/90 |
| 2015/0295856 A1* | 10/2015 | Karthikeyan | H04L 65/80 370/230 |

* cited by examiner

REMOTE MEDIUM ACCESS CONTROL (MAC) BASED NETWORKS

BACKGROUND

A variety of service providers, such as cable providers and satellite providers, may connect user devices to one or more networks, such as cable networks and/or the Internet. A provider may provide cable and/or Internet access to a residence via devices such as headend devices that includes a computer system and databases required for the provisioning of content. The headend may include cable modem termination system (CMTS), which can send and receives cable modem signals on a cable network, for example, to provide Internet services to cable subscribers.

BRIEF DESCRIPTION OF THE DRAWINGS

Reference will now be made to the accompanying drawings, which may not necessarily be drawn to scale, and wherein.

DETAILED DESCRIPTION OF VARIOUS EMBODIMENTS

Figure 1:
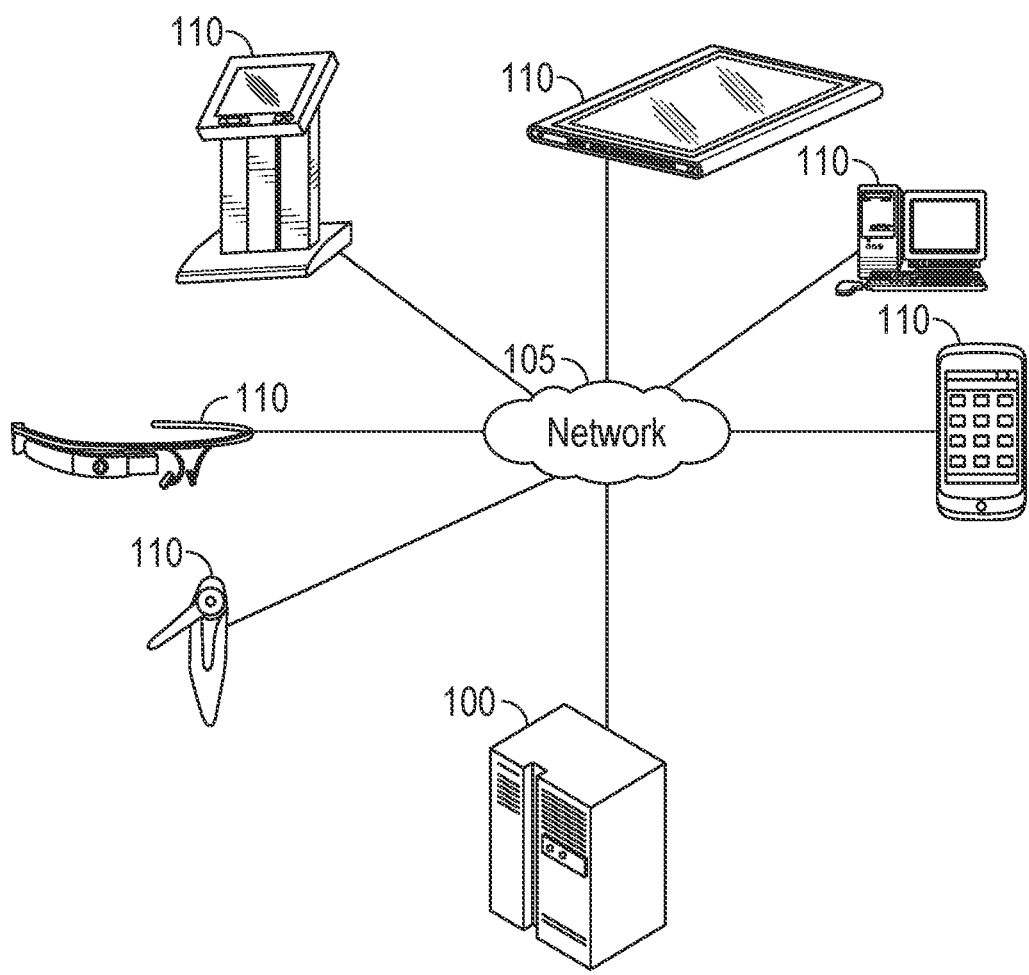
FIG. 1 shows an example schematic diagram of a system that can be used to practice embodiments of the present disclosure.

The details of one or more embodiments of the subject matter described herein are set forth in the accompanying drawings and the description below. Other features, aspects, and advantages of the subject matter will become apparent from the description, the drawings, and the claims.

In various example embodiments, the systems, methods, and apparatuses described herein provide for remote medium access control (MAC) in communication networks, for example, in cable networks. In some aspects, the disclosure describes a network architecture including a switch (e.g., a headend switch connected to a metropolitan network) configured to communicate with one or more remote MAC layer devices over first connections (e.g., digital fiber connections); the remote MAC layer devices configured to communicate with one or more remote physical (PHY) layer devices over second connections (e.g., second digital fiber connections); and the remote PHY layer device configured to communicate with customer premise equipment devices over a third connection (e.g., analog coaxial connections).

Embodiments of the disclosure may enable additional geographical network coverage of a cable network by deploying remote MAC devices at the outside plant side of a cable network. In another embodiment, when a given network switch (e.g., a network switch connected at a hub or headend on a metropolitan cable network) receives data packets for distribution to customer premise equipment, the packets may be transmitted over digital fiber using a given protocol (e.g., ethernet) to the remote MAC devices provided in the field (e.g., in the outside plant), thereby leading to reduced power usage for a given portion of the cable network. In another embodiment, the remote MAC devices may be communicatively coupled to multiple remote PHY devices (e.g., devices operating at the physical layer level), and each remote PHY device may transmit received data packets over coaxial cable to given customers (for example, at customer's premise equipment, such as at cable modems).

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

I. COMPUTER PROGRAM PRODUCTS, METHODS, AND COMPUTING ENTITIES

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXAMPLE SYSTEM ARCHITECTURE

FIG. 1 provides an illustration of an example embodiment of the present disclosure. As shown in FIG. 1, this particular embodiment may include one or more management computing entities 100, one or more networks 105, and one or more user devices 110. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

In various aspects, the management computing entities 100 may include various devices on a cable network, including, but not limited to, switches, remote MAC devices, cable modem termination system (CMTS) devices, remote PHY devices, amplifiers, fiber nodes, and the like, to be variously described below. In another aspect, such devices may include circuitry (e.g., processors and memory) and associated software instructions (e.g., computer code) to perform various functions associated with such devices (e.g., transmit packets, receive packets, process packets, sort packets, provide status updates, download and install software updates, etc.).

In another aspect, the networks 105 may include, but not be limited to, cable networks including hybrid fiber-coaxial cable networks. More broadly, the networks 105 may include at least portions of wireless networks or wired networks. In another aspect, a cable network may use various sub-networks (e.g., WiFi networks, cellular networks) to perform aspects of the functionality described herein, for example, in connection with the disclosed devices (e.g., switches, remote MAC devices, CMTS devices, remote PHY devices, amplifiers, fiber nodes, and the like).

In another aspect, the user devices 110 may include, but not be limited to, devices associated with a customer premise equipment (e.g., one or more devices at a customer home). Non-limiting examples may include, but not be limited to, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein.

1. Example Management Computing Entity

Figure 2:
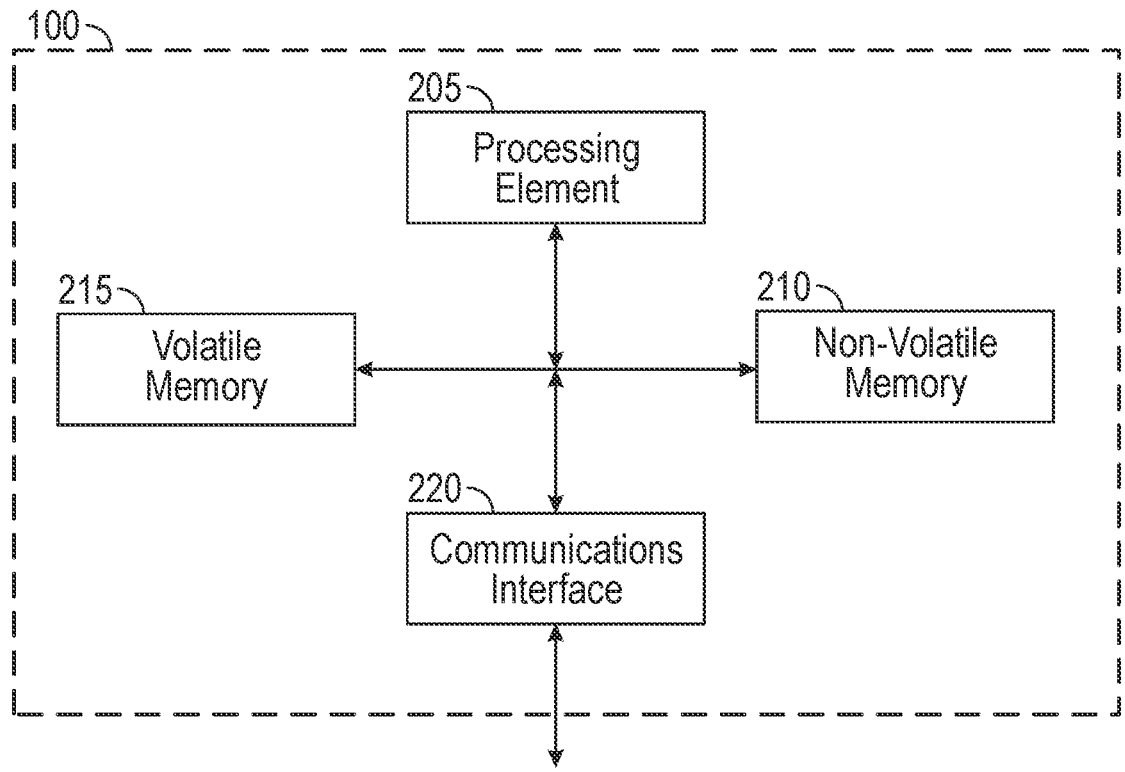
FIG. 2 shows an example schematic diagram of a management computing entity, in accordance with example embodiments of the disclosure.

FIG. 2 provides a schematic of a management computing entity 100 according to one embodiment of the present disclosure. As noted above, a management computing entity 100 may include various devices on a cable network, including, but not limited to, switches, remote MAC devices, CMTS devices, remote PHY devices, amplifiers, fiber nodes, and the like, to be described below (see for example, FIGS. 4-7 and related discussion).

In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. For instance, the management computing entity 100 may communicate with user devices 110 and/or a variety of other computing entities.

As shown in FIG. 2, in one embodiment, the management computing entity 100 may include or be in communication with one or more processing elements 205 (also referred to as processors, processing circuitry, and/or similar terms used herein interchangeably) that communicate with other elements within the management computing entity 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the management computing entity 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 100 with the assistance of the processing element 205 and operating system.

As indicated, in one embodiment, the management computing entity 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol.

Although not shown, the management computing entity 100 may include or be in communication with one or more input elements, such as a keyboard input, a mouse input, a touch screen/display input, motion input, movement input, audio input, pointing device input, joystick input, keypad input, and/or the like. The management computing entity 100 may also include or be in communication with one or more output elements (not shown), such as audio output, video output, screen/display output, motion output, movement output, and/or the like.

As will be appreciated, one or more of the management computing entity's 100 components may be located remotely from other management computing entity 100 components, such as in a distributed system. Furthermore, one or more of the components may be combined and additional components performing functions described herein may be included in the management computing entity 100. Thus, the management computing entity 100 can be adapted to accommodate a variety of needs and circumstances. As will be recognized, these architectures and descriptions are provided for example purposes only and are not limiting to the various embodiments.

2. Example User Device

A user may be an individual, a family, a company, an organization, an entity, a department within an organization, a representative of an organization and/or person, and/or the like. In one example, users may be employees, residents, customers, and/or the like. For instance, a user may operate a user device 110 that includes one or more components that are functionally similar to those of the management computing entity 100. In some aspects, user devices 110 may include, but not be limited to, devices associated with a customer premise equipment, as described above. In another aspect, the user device 110 may be configured to receive data from a fiber node (e.g., fiber node 410 to be shown and described in connection with FIG. 4), or to receive data from a remote PHY device (e.g., a remote PHY device to be shown and described in connection with FIGS. 5 and/or 6.

Figure 3:
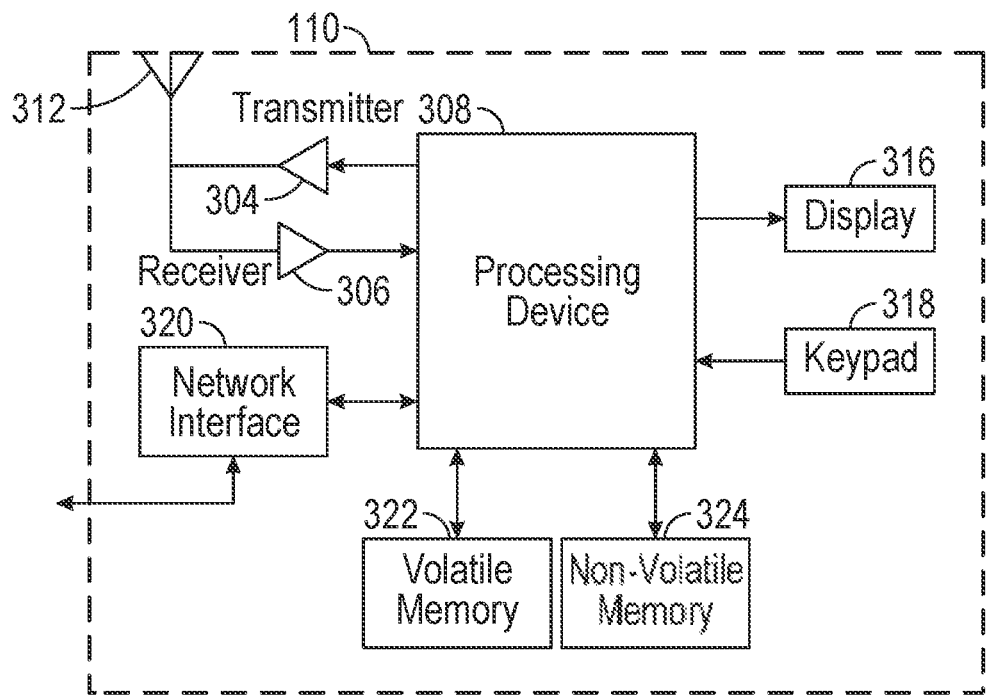
FIG. 3 shows an example schematic diagram of a user device, in accordance with example embodiments of the disclosure.

FIG. 3 provides an illustrative schematic representative of a user device 110 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (for example Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User devices 110 can be operated by various parties. As shown in FIG. 3, the user device 110 can include an antenna 312, a transmitter 304 (for example radio), a receiver 306 (for example radio), and a processing element 308 (for example CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user device 110 may be capable of operating with one or more air interface standards, communication protocols, modulation types, and access types. More particularly, the user device 110 may operate in accordance with any of a number of wireless communication standards and protocols, such as those described above with regard to the management computing entity 100. In a particular embodiment, the user device 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user device 110 may operate in accordance with multiple wired communication standards and protocols, such as those described above with regard to the management computing entity 100 via a network interface 320.

Via these communication standards and protocols, the user device 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user device 110 can also download changes, add-ons, and updates, for instance, to its firmware, software (for example including executable instructions, applications, program modules), and operating system.

According to one embodiment, the user device 110 may include location determining aspects, devices, modules, functionalities, and/or similar words used herein interchangeably. For example, the user device 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's 110 position in connection with a variety of other systems, including cellular towers, Wi-Fi access points, and/or the like. Similarly, the user device 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user device 110 to interact with and/or cause display of information from the management computing entity 100, as described herein. The user input interface can comprise any of a number of devices or interfaces allowing the user device 110 to receive data, such as a keypad 318 (hard or soft), a touch display, voice/speech or motion interfaces, or other input devices. In embodiments including a keypad 318, the keypad 318 can include (or cause display of) the conventional numeric (0-9) and related keys (#, *), and other keys used for operating the user device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user device 110. As indicated, this may include a user application that is resident on the entity or accessible through a browser or other user interface for communicating with the management computing entity 100 and/or various other computing entities.

In another embodiment, the user device 110 may include one or more components or functionality that are the same or similar to those of the management computing entity 100, as described in greater detail above. As will be recognized, these architectures and descriptions are provided for example purposes only and are not limiting to the various embodiments.

III. EXAMPLE SYSTEM OPERATION

In various aspects, the disclosure describes systems, methods, and apparatus for remote Medium Access Control (MAC)-based network architectures, for example, in cable networks. Embodiments of the disclosure may enable additional geographical network coverage for a given cable network by deploying remote MAC devices at the outside plant side of a cable network. In another embodiment, when a given network switch (e.g., a network switch connected at a hub or headend on a metropolitan cable network) receives data packets for distribution to customer premise equipment, the packets may be transmitted over digital fiber using a given protocol (e.g., ethernet) to the remote MAC devices provided in the field (e.g., in the outside plant). In another embodiment, the remote MAC devices may be communicatively coupled to multiple remote physical (PHY) devices (e.g., devices operating at the physical layer level), and each remote PHY device may transmit received data packets over coaxial cable to given customers (for example, at customer's premise equipment, such as at cable modems).

In another embodiment, as used herein, the physical layer can represent a fundamental layer underlying the logical data structures of higher level functions (for example, the MAC layer) in a network. The physical layer can define the means of transmitting raw bits rather than logical data packets over a physical link connecting network nodes. The bit stream may be grouped into code words or symbols and may be converted to a physical signal that is transmitted over a hardware transmission medium (e.g., coaxial cable). The physical layer may provide an electrical and procedural interface to the transmission medium. The physical layer may include the shapes and properties of the electrical connectors, the frequencies to broadcast on, the modulation scheme to use and the like.

In various aspects, the disclosed remote MAC network architecture may integrate with existing backbone ring networks at switches; moreover, the backbone ring networks may serve to interconnect various pieces of broader metropolitan and inter-state and/or national networks, providing a path for the exchange of information between different sub-networks. Moreover, each backbone ring network may feed data to multiple metropolitan networks. In another embodiment, the metropolitan ring networks may tie into headend devices. In another embodiment, the headend devices may feed a number of hubs. Further, the hubs may feed down to the remote MAC devices, for example, at the switch. Further, the connection may include an ethernet (e.g., 10 gigabyte ethernet) connection to transmit data packets from the switch to a given remote MAC device.

In another embodiment, a network scheduler may be configured to over in connection with the various devices of the remote MAC-based network. For example, the network scheduler may perform scheduling of the data packets at various devices (e.g., at the headend and/or hub devices, the remote MAC devices, and the like) at the outside plant side. Further, the multiple remote PHY devices may receive data packets from a given remote MAC device based on a schedule determined by the network scheduler. For example, a network scheduler may feed multiple (e.g., twenty-four) remote PHY devices out of a single remote MAC device having dedicated MAC computer chip(s) employing MAC functionality. Moreover, because remote MAC devices may have dedicated computer chips with relatively high processing power, a given remote MAC device in combination with associated remote PHY devices may be able to provide data to a relatively large number of customers (e.g., approximately twenty thousand customers).

Further, better power efficiency may be obtained in the described remote MAC network architectures at least because the remote MAC devices are being maximally utilized. For example, the processing (e.g., routing, encapsulation, securing, etc.) performed by the remote MAC devices, an amount of power (e.g., approximately 20 kilowatts) may be used regardless of the number of remote PHY devices that are connected to a given remote MAC device (e.g., below a predetermined threshold number of remote PHY devices). Accordingly, if a single remote PHY device may be used in connection with the remote MAC device the remote PHY device may feed a relatively small number (e.g., 50) of customers. However, if the same remote MAC device where to be in communication with a large number (e.g., 20) of remote PHY devices, and each remote PHY device serviced a number (e.g., 50) of customer premise sites, then the remote MAC device may be able to service a larger number (e.g., 1000) of customers while still using the same remote MAC device power level (e.g., 20 kW), thereby leading to higher power utilization efficiency by the remote MAC device.

In an embodiment, embodiments of the disclosure may include one or more remote MAC devices, which in combination with a switch at a headend device and (optionally) in combination with remote PHY devices, may perform aspects of a control plane functionality, a management plane functionality, and/or a data plane functionality. In an embodiment, the management plane functionality associated with a networking device can refer to configuring, monitoring, and providing management, monitoring and configuration services to, various devices operating at various layers of the network stack and other parts of the network. In an embodiment, the management plan functionality can be distinguished from the control plane functionality, in that the control plane functionality can be directed to implementing routing table and forwarding information activities. In an embodiment, devices (such as the remote MAC device) described herein that operate on the control plane can refer to devices that determine where data traffic is sent on the network. In an embodiment, such control plane device can implement aspects of the system configuration, management, and exchange of routing table information. In an embodiment, a route controlling functionality associated with the control plane can exchange topology information associated with the system with other router devices on the network, and a routing table can be generated based on a routing protocol. In an embodiment, devices that can send and receive control plane packets can be processed by a device implementing router functionality to update routing table information. In an embodiment, devices described herein that operate on the data plane can refer to devices that can forward data traffic to a next hop along a data path to a given destination network device according to control plane logic. In an embodiment, data plane packets can be processed using a remote MAC device that implements router and/or switch functionality.

Figure 4:
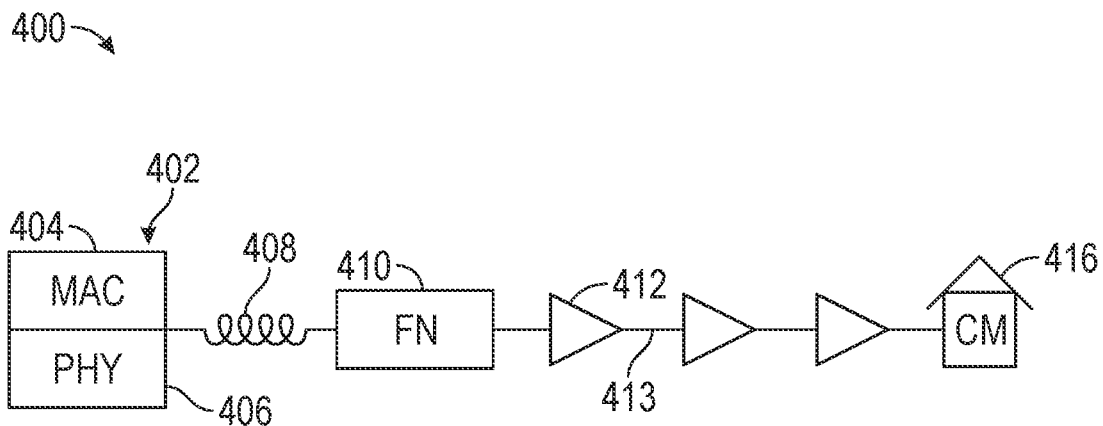
FIG. 4 shows an example diagram of a portion of a cable network and associated devices in a network deployment, in accordance with example embodiments of the disclosure.

FIG. 4 shows an example diagram of a portion of a cable network and associated devices in a particular network deployment, in accordance with example embodiments of the disclosure. In some aspects, diagram 400 shows a network including a cable modem termination system (CMTS) 402. In an embodiment, the CMTS can have a converged cable access platform (CCAP) functionality. In another embodiment, the CMTS 402 may include a MAC layer 404 functionality (e.g., as defined, for example, with respect to the open systems interconnection model, OSI) and a PHY layer 406 functionality (e.g., also as defined with respect to the OSI model). The OSI model can refer to a model that characterizes and standardizes one or more communication functions of a network. In some aspects, the model may disregard some aspects of the network's underlying internal structure and specific implementation technology. In some implementations, the layers encompassing the functionality of the one or more aspects of the OSI model of the communications network may be performed by a single device (e.g., a remote MAC device), for example, using processors and memory manipulations configured to execute respective layer functionality.

In one aspect, the diagram 400 may further include a fiber node 410 that may be connected to the CMTS a using fiber link 408. Moreover, the diagram 400 further includes customer premise equipment 416, which may include one or more cable modems (not shown). In another embodiment, the customer premise equipment 416 may be connected to the fiber node 410 using coaxial cable 413 and may include one or more amplifiers 412 to reduce signal attenuation for signals traveling over the coaxial cable 413.

In another embodiment, data packets that are received by the CMTS 402 (e.g., from a hub or headend device as part of a broader metropolitan network), may interface with the MAC layer 404 of the CTMS 402. Moreover, the data packets may be transmitted to another device (e.g., to the fiber node 410) using the PHY layer 406. For example, the data packets may be transmitted from the CMTS 402 to a fiber plant (not shown) having one or more fiber nodes such as fiber node 410. As noted, the fiber node 410 may then transmit the data packets on a transmission medium (for example, coaxial fiber), and the data packets may be delivered to a customer premise equipment 416, such as at a cable modem.

In an aspect, once the fiber node 410 receives analog signals from the CMTS 402, the fiber node 410 may perform many operations including, but not limited to, digitizing the analog signals for internal processing, converting the processed digital signals back to analog signals, and transmitting the analog signals using coaxial cables 413 to the customer premise equipment 416 using amplifiers 412 (e.g., amplifiers every approximately 1000 feet) to prevent the attenuation of the signal.

In another embodiment, a CMTS 402 in the network configuration of diagram 400 may provide data to approximately a relatively large number of customers (e.g., approximately 20,000 customers). Moreover, the CMTS 402 may provide the data using approximately 20 kilowatts (kW) of power, which may be determined by numerous factors, individually or in combination, such as using approximately 1 watt (W) per customer.

In another embodiment, the PHY layer 406 of the CMTS 402 may feed received signals (e.g., signals received from a hub or headend device on a cable network, not shown) into a combiner device (not shown). In another embodiment, the combiner device may the take various data signals (e.g., voice, video, and data signals) from several channels (e.g., 160, 200, 800, or 1000 channels having a bandwidth between up from approximately 0 Hertz to approximately 1.2 Giga-Hertz), and may feed the data signals into a combiner device, which may then feed the data signals into a laser transmitter. Moreover, the combiner device may combine the signals, digitize the signals for internal processing, convert the processed signals to analog signals, and transmit the analog signals using one or more analog lasers. In another embodiment, the fiber node 410 may receive analog signals from the CMTS 402 using analog laser receivers.

In another embodiment, the CMTS 402 may be enclosed in a chassis including devices providing the PHY layer and MAC layer functionality. In another embodiment, the CMTS 402 may use a relatively large amount of power (e.g., at least 80 Watts of power) to amplify transmitted signals to the fiber node 410. This may be because the CMTS may need a sufficient power to power a gain module to amplify the received signals through the combiner device (as described above), transmit the received signals with sufficient power to reach a given fiber node (e.g., fiber node 410), and translate received signals from digital to analog domains, and perform other similar operations.

In another embodiment, for the legacy network architectures shown and described in connection with FIG. 4 (e.g., diagram 400) a considerable amount of space and equipment may need to be used to transmit information. In one aspect, one headend may be located in Phoenix, Ariz. The headend may provide service to around 500,000 customers using 20 CMTSs (e.g., similar to CMTS 402 of FIG. 4) in the headend. The headend may be the size of a large warehouse, and may include racks of equipment.

In various aspects, the CMTS 402 and/or the fiber node 410 may include aspects of the functionality of the management computing entity 100, as shown and described in connection with FIGS. 1-2, above. In particular, the CMTS 402 and/or the fiber node 410 may include or be in communication with one or more processing elements 205, memory 210, volatile memory 215, and may include a communication interface 220 (e.g., to communicate with between each other and with various customer premise equipment such as cable modems).

Moreover, the customer premise equipment 416 may include devices that include aspects of the functionality of the user device 110, as further shown and described in connection with FIG. 3, above. For example, customer premise equipment 416 may include a transmitter 308, a receiver 304, and/or a network interface (e.g., to communicate with an access point or other device to receive information from the fiber node 410 or similar device). Moreover, the customer premise equipment 416 may include volatile memory 322 and/or non-volatile memory 324 in addition to a processor (e.g., to perform one or more computational tasks, such as processing received signals, etc.). Further, the customer premise equipment 316 may include a display 416 and/or a keypad 318 (e.g., for interacting with a user or operator).

Figure 5:
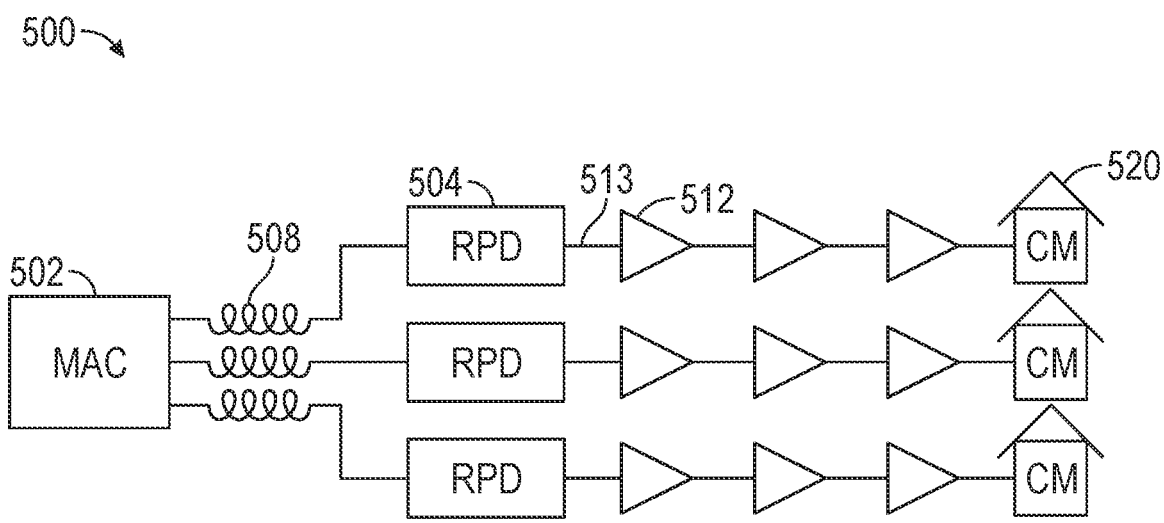
FIG. 5 shows another diagram of a remote physical (PHY) network architecture, in accordance with example embodiments of the disclosure.

FIG. 5 shows another diagram of a remote PHY network architecture, in accordance with example embodiments of the disclosure. In particular, the network architecture depicted in diagram 500 may separate out the functionality of the CMTS (e.g., the CMTS 402 shown and described in connection with FIG. 1, above) into a MAC layer device 502 and one or more remote PHY devices 504. In another embodiment, networks making use of remote PHY devices 504 may use at least two different methods of transmitting data packets. In a first method depicted in diagram 500, a hardware-based MAC layer device 502 may receive incoming data packets (e.g., from another device such as a headend or hub, not shown) and may transmit the data packets to a remote PHY device 504 over fiber 508 (e.g., digital fiber). In another embodiment, the data packets may be transmitted to another device (e.g., a customer premise equipment) using the remote PHY device 504. In particular, the data packets can be transmitted from the remote PHY device 504 on coaxial fiber 513 to a customer (for example, to a customer's premise equipment 520, such as a cable modem) using amplifiers 512 to prevent the attenuation of the signal.

In another embodiment, the distance and geographical area that may be covered using a fiber connection (e.g., fiber 508) using the hardware-based MAC device 502 and remote PHY device architecture of diagram 500 may be greater than the distance and geographical area covered using the CMTS 402 and fiber node 410 architecture of diagram 400. In particular, the connection between the CMTS 402 and the fiber node 410 in diagram 400 may be made using an analog fiber connection 408, whereas the connection between the hardware-based MAC layer device 502 and the remote PHY device 504 may use a digital fiber connection 508 having a lower-degree of attenuation per unit length of fiber. In another embodiment, the communication between the hardware-based MAC device 502 and the remote PHY device may include a downstream external PHY interface (DEPI) protocol or an upstream external PHY interface protocol (UEPI), which may use more processing power than similar communication protocols (e.g., ethernet) between the switch and a remote MAC layer device, to be described in connection with FIG. 6, below.

As noted, in an aspect, networks making use of remote PHY devices 504 may use at least two different methods of transmitting data packets, the first method of which was described above. A second method to transmit data packets on the network may involve performing aspects of the above transmission in software (e.g., in a cloud computing environment). In such a case, the MAC layer 502 functionality may be software-implemented (for example, in the cloud), and such functionality may be referred to as a virtual MAC (VMAC) layer 502. Accordingly, as packets are received (e.g., from another device such as a headend, not shown) and processed by the VMAC 502, the data packets then get transmitted out (e.g., using ethernet switches, hubs, routers and the like) to the remote PHY device 504 over fiber 508 (e.g., digital fiber). From the remote PHY device 504, the data packets may be transmitted over coaxial cables 513 to a customer (for example, to a customer's premise equipment 520, such as a cable modem) using one or more amplifiers 512 to reduce the attenuation of the signal.

In another embodiment, the hardware-based MAC device 502 may use a chip (e.g., a MAC chip) having a relatively large amount of processing power, and a portion of the processing power may be wasted, as will be described. For example, the hardware-based MAC device 502 may use one MAC chip for every 500 customers in practice; however, the MAC chip may be able to handle approximately 2000 customers. Therefore, by not fully utilizing the capacity offered by a MAC chip, the hardware-based MAC device network architecture may not be optimal from a power-efficiency perspective.

In one aspect, the distance and geographical area that may be covered using a fiber connection in the remote PHY architecture of diagram 500 may be greater than the distance and geographical area covered using the CMTS and fiber node architecture of diagram 400. In particular, the connection between the CMTS and the fiber node in diagram 400 may be made using an analog fiber connection (e.g., fiber 408), whereas the connection between the software-based virtual MAC layer device 502 and the remote PHY device 504 may use a digital fiber connection (e.g., fiber 508) having a lower-degree of attenuation per unit length of fiber.

In another embodiment, a software-based MAC device 502 may run off of a computer platform having a given chip architecture (e.g., x86-based architecture) which may use a relatively large amount of power. Further, the speed and processing ability of the software-based MAC 502 may be limited by the server that that runs the software-based MAC. For example, a given server may include one or more 24-core processor that may handle the processing of several remote PHY devices (e.g., remote PHY device similar to remote PHY device 504), but the back plane of such a server may only be able handle a limited bandwidth (e.g., 20, 30, or 40 gigabits per second); accordingly, the power usage by the server may drive up the power usage by the overall network.

In various aspects, the MAC device 502 and/or the remote PHY device 504 may include aspects of the functionality of the management computing entity 100, as shown and described in connection with FIGS. 1-2, above. In particular, the MAC device 502 and/or the remote PHY device 504 may include or be in communication with one or more processing elements 205, memory 210, volatile memory 215, and may include a communication interface 220 (e.g., to communicate with between each other and with various customer premise equipment such as cable modems).

Moreover, the customer premise equipment 520 may include devices that include aspects of the functionality of the user device 310, as further shown and described in connection with FIG. 3, above. For example, customer premise equipment 520 may include a transmitter 308, a receiver 304, and/or a network interface (e.g., to communicate with an access point or other device to receive information from the remote PHY device 504 or similar device). Moreover, the customer premise equipment 520 may include volatile memory 322 and/or non-volatile memory 324 in addition to a processor (e.g., to perform one or more computational tasks, such as processing received signals, etc.). Further, the customer premise equipment 416 may include a display 316 and/or a keypad 318 (e.g., for interacting with a user or operator).

Figure 6:
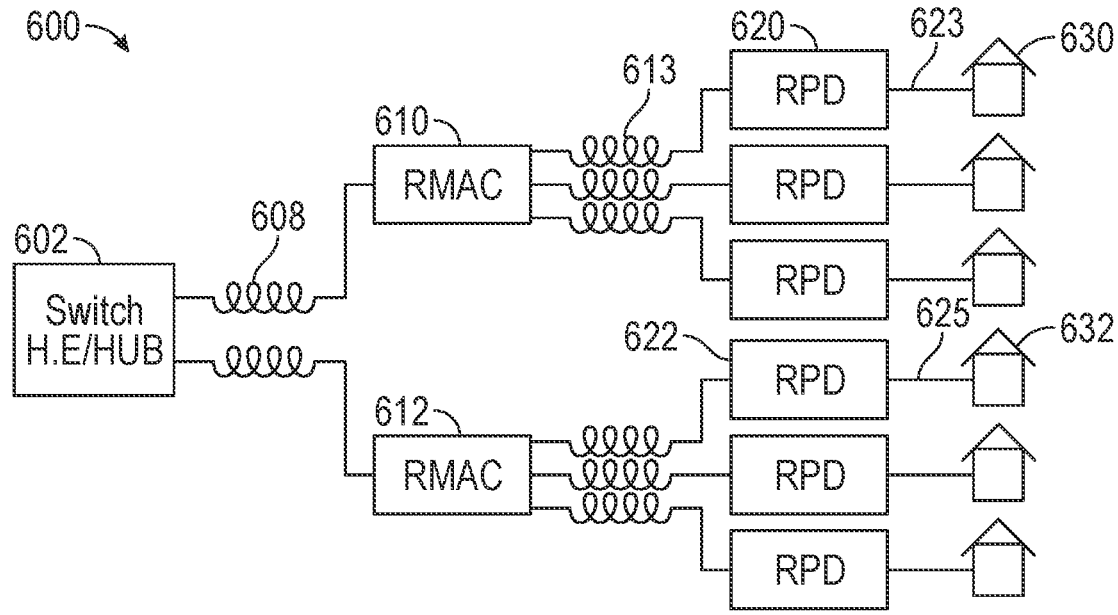
FIG. 6 shows another diagram of a remote Medium Access Control (MAC) network architecture, in accordance with example embodiments of the disclosure.

FIG. 6 shows another diagram of a remote MAC network architecture, in accordance with example embodiments of the disclosure. In particular, the diagram 600 shows a switch 602 at the headend and/or hub (not shown) of the network. Further, when the switch 602 receives data packets, the packets may be transmitted over fiber 608 (e.g., digital fiber) using a given protocol (e.g., ethernet) to one or more remote MAC devices (e.g., remote MAC device 610 and remote MAC device 612) that may be provided in the field (e.g. in an outside plant area). In another embodiment, the switch may connect to a headend or hub (not shown) that may also be provided in the field (e.g., in the outside plant area). In another embodiment, each remote MAC device (e.g., remote MAC device 610 and remote MAC device 612) may be coupled to multiple remote PHY devices (e.g., remote PHY device 620 and remote PHY device 622). Further, each remote PHY device may transmit received data packets to given customers (for example, at customer's premise equipment 630, such as at cable modems).

In another embodiment, the scheduling of the data packets (for example, by a network scheduler) may be performed by one or more devices (e.g., headend and/or hub devices, remote MAC devices, and the like) at the outside plant side. Further, the multiple remote PHY devices (e.g. remote PHY device 620 or 622) may be fed from a given remote MAC device 610. For example, a network scheduler may feed multiple (e.g., twenty-four) remote PHY devices out of a single remote MAC device 610 (e.g., a device having a single chip employing MAC functionality), in part because remote MAC device 610 may have a relatively high processing power. Accordingly, in certain areas (e.g., areas with relatively high cable network penetration), a given remote MAC device in combination with associated remote PHY devices may be able to provide data to a relatively large number of customers (e.g., approximately twenty thousand customers).

In another embodiment, the distance and geographical area that may be covered using a fiber connection in the remote MAC architecture of diagram 600 may be greater than the distance and geographical area covered using the CMTS and fiber node architecture of diagram 400. In particular, the connection between the CMTS 402 and the fiber node 410 in diagram 400 may be made using an analog fiber 408 connection, whereas the connection between the switch 602 and the remote MAC layer device 610 may use a digital fiber 608 connection having a lower-degree of attenuation per unit length of fiber. Further, the connection may include an ethernet (e.g., 10 gigabyte ethernet) connection to transmit data packets from the switch 602 to the remote MAC device 610.

As noted, the switch 602 can transmit to multiple remote MAC devices (e.g., example remote MAC device 610 and remote MAC device 612), each of which may feed as many remote PHY devices (e.g., remote PHY device 620 and remote PHY device 622). Further, a better power efficiency may be obtained using the architecture of diagram 600, at least because the remote MAC devices are being maximally utilized. For example, for the processing associated with the remote MAC devices (e.g., remote MAC device 610), an amount of power (e.g., approximately 20 kilowatts) may be used regardless of the number of remote PHY devices that are connected to a given remote MAC device below a predetermined threshold. Accordingly, a single remote PHY device (e.g., remote PHY device 620) may be used in connection with the remote MAC device (e.g., a remote MAC device 610) and the remote PHY device may feed a relatively small number (e.g., 50) of customers. However, if the same remote MAC device where to be in communication with a large number (e.g., 20) of remote PHY devices, and each remote PHY device serviced a number (e.g., 50) of customer premise sites, then the remote MAC device would be able to service a larger number (e.g., 1000) of customers, while still using the same remote MAC device power level (e.g., 20 kW), thereby leading to higher power utilization efficiency the remote MAC device.

In some embodiments, the remote MAC devices (e.g., a remote MAC device 610) may provide addressing and/or channel access control mechanisms that can allow several terminals or network nodes to communicate within a multiple access network that incorporates a shared medium, for example ethernet, cable, telecommunications, wireless, or other type of network. In an embodiment, the remote MAC devices can provide a full-duplex logical communication channel in a multi-point network. Multipoint networks can include, but not be limited to, wireless Internet and IP telephony networks, for example, using gigahertz radio frequencies. This channel may provide unicast, multicast or broadcast communication service. Further some functions performed by the remote MAC devices can include frame delimiting and recognition, addressing of destination network nodes (both as individual nodes and as groups of nodes), conveying of addressing information, protecting against errors, for example by generating and/or checking frame check sequences, and controlling access to the physical transmission medium. In various embodiments, the remote MAC devices can perform mapping operations. For example, the remote MAC devices can associate a service flow identifier to a data group and/or a service group, for example, as a part of a bonding group. In some implementations, the functionality of the remote MAC devices described above may be performed by one or more management computing entity 100 as shown in FIG. 1 and FIG. 2.

In another embodiment, the remote PHY devices (e.g., remote PHY devices 620 and 622) in the network architecture of FIG. 6 may not need to serve a large number (e.g., 500) of customers. That is, in comparison to the remote PHY devices shown and described in connection with FIG. 5 (e.g., remote PHY device 504, above), the remote PHY devices of diagram 600 may need to supply data to fewer customers, and therefore, the remote PHY devices of diagram 600 may be smaller, cheaper, and have a lower power capacity with respect to the remote PHY devices shown and described in connection with FIG. 5. Further, in comparison with the CMTS 402 having a dual MAC and PHY layer capability shown and described in connection with FIG. 4, above, the remote PHY devices in the network architecture of diagram 600 shown and described in FIG. 6 may use significantly less power. For example, the remote PHY devices in the network architecture of FIG. 6 may use 20 watts, while the CMTS 402 shown and described in connection with FIG. 4, above, may use a higher power level (e.g., 160 watts). For example, the CMTS 402 of FIG. 4 may need to use the higher power level (e.g., 160 watts) in part because the CMTS 402 may use various gain blocks to add power to the received signals (e.g. from a hub or headend) over analog fiber. Such received signal may include attenuated analog signal which may need to be amplified and covered to a digital signal by the CMTS 402, for example, using an analog-to-digital (A/D) converter for internally processing (e.g., filtering, noise removal, etc.). Further, the CMTS 402 may need to turn the digital signal back to an analog signal for transmission over analog fiber 408 to the fiber node 410, for example, using analog lasers. Moreover, the fiber node 410 may receive the attenuated analog signal, amplify it, turn the signal back to a digital signal for processing (e.g., filtering, noise removal, etc.), and convert the signal back into analog form in order to transmit it over coaxial fiber 413 to the customer premise 416. In contrast, in the network architecture of FIG. 6, the devices (e.g., the switch 602, the remote MAC devices 610 and/or 612, and/or the remote PHY devices 620 and/or 622) may communicate over digital fiber 608; further, the remote PHY devices (e.g., remote PHY devices 620 and/or 622) may only use analog transmission over coaxial cable 623 and/or 625 within a short distance (e.g., approximately 1000 feet) of the customer premise equipment (e.g., customer premise equipment 630 and/or 632). In another embodiment, the remote MAC devices 610 and/or 612 may be implemented in hardware or software (e.g., as a virtual remote MAC).

In one embodiment, the communication between a remote MAC device 610 (e.g., the outside plant MAC) and a remote PHY device 620 may include a DEPI and/or a UEPI protocol, which may involve a relatively high high-power usage by the chips and electronics powering the remote MAC device 610 and/or the remote the PHY device 620. Moreover, the high power-usage may be performed over a relatively short distance (e.g., over the digital fiber link 613 between the remote MAC device 610 and the remote PHY device 620, which may include a distance of approximately 300 meters to approximately 10 kilometers). Moreover, between the switch 602 and the remote MAC device 610, an ethernet protocol may be used, and therefore, there may be no need to implement transmission protocols such as DEPI and/or UEPI, thereby saving power usage (e.g., saving equipment such as racks of servers to perform of the MAC-layer processing).

Moreover, the network architecture depicted in diagram 600 may result in a configuration where there may be no significant latency between the remote MAC device 610 and the remote PHY device 620 since the distance between the remote MAC device 610 and the remote PHY device 620 may be relatively small (e.g., approximately 300 meters to approximately 10 km). Moreover, the distance between the switch 602 and the remote MAC device 610 may be relatively large (e.g., hundreds of kilometers, thousands of kilometers) providing the ability to cover a relatively large geographical extent. As noted, the distance between the remote PHY device 620 and the customer premise equipment 630 may be relatively short (e.g., about 300 meters). Further, each remote PHY device 620 may support on average between 50 and 250 customers, each customer having several devices (e.g., 5-20 devices).

In another embodiment, each remote MAC device (e.g., remote MAC device 610 or 612) may have a smaller area footprint than traditional MAC devices (e.g., non-remote MAC devices such as MAC devices shown and described in connection with FIGS. 4-5, above), which may have an average area of 20 rack units. In the case of the hardware-based MAC device 502 of diagram 500 of FIG. 5, the space requirement for the hardware MAC device 502 may be similar to that of the CMTS 402 of FIG. 4 (e.g., the size of a warehouse), while the power requirement may be reduced (e.g., due to digital transmissions between the hardware MAC 502 and the remote RPD device 504). Moreover, in the case of the software-based MAC device, the power requirement for a virtual MAC device may increase based on the backplane capabilities of the hosting cloud-based servers.

In the network architecture of diagram 600 of FIG. 6, there may not be a need to include a headend device (e.g., similar to a headend device 402 of FIG. 4), since the processing is largely performed by remote MAC devices 610 and/or 612 and remote PHY devices 620 and/or 622 in the field (e.g., outside plant), thereby saving headend space and reducing power requirements. In particular, by using remote MAC devices (e.g., remote MAC device 610 or 612) instead of a centralized traditional MAC device, each remote MAC device may use less power, while simultaneously increasing the customer base and the speed and efficiency of the network.

In another embodiment, in the network architecture of diagram 600, there may be no need for analog lasers, as was needed for the network architecture of diagram 400 shown and described in connection with FIG. 4. In particular, in the network architecture of diagram 400, there may be a need for analog lasers (e.g., analog lasers between the CMTS 402 and the fiber nodes 410). Accordingly, the network architecture of diagram 600 achieve higher speeds in comparison to the network of diagram 400 because of the removal of the analog lasers and the transmission and reception of data in the digital domain. Further, the network in diagram 600 may achieve higher speeds because the remote PHY device 620 may be closer to the customer premise equipment 630 (e.g., around 300 meters from the customer premise equipment 630). Moreover, there may be no need for including one or more amplifiers (e.g., amplifiers similar to amplifiers 412 and/or 512 shown and described in connection with FIGS. 4 and 5, respectively) between the remote PHY device 620 and the customer premise equipment 630, which may be needed in the network architectures shown and described in connection with FIGS. 4-5 (e.g., between the fiber node 410 or the remote PHY devices 504 and the customer premise equipment 416 and 520, respectively).

In another embodiment, instead of having analog transmit and receive lasers at a CMTS (e.g., similar to CMTS device 402 of diagram 400) and the fiber node device (e.g., fiber node 410) as was supplied in the network architecture of diagram 400, in the network architecture of diagram 600, there may only be a transceiver (e.g., the switch 602) which may be provided using data center lasers. As noted, the lasers in the network architecture of diagram 400 may include analog lasers, and in some embodiments, there may be an analog laser needed for groups of 100 customers. However, the network architecture diagram 600 may employ digital transceivers between the switch 602 and remote MAC devices 610 and/or 612, and/or between the remote MAC devices 610 and/or 612 and the remote PHY devices 620 and/or 622, there may be far fewer lasers needed as compared with CMTS 402 and the fiber node 410. Also, transceivers (e.g., 10 Gigabit ethernet transceivers) may be located at the data center between the switch 602 and the remote MAC devices 610 and/or 612.

In various aspects, the switch device 602, the remote MAC device 610, and/or the remote PHY device 620 may include aspects of the functionality of the management computing entity 100, as shown and described in connection with FIGS. 1-2, above. In particular, the switch device 602, the remote MAC device 610, and/or the remote PHY device 620 may include or be in communication with one or more processing elements 205, memory 210, volatile memory 215, and may include a communication interface 220 (e.g., to communicate with between each other and with various customer premise equipment such as cable modems).

Moreover, the customer premise equipment 630 may include devices that include aspects of the functionality of the user device 310, as further shown and described in connection with FIG. 3, above. For example, customer premise equipment 630 may include a transmitter 308, a receiver 304, and/or a network interface (e.g., to communicate with an access point or other device to receive information from the remote PHY device 620 or similar device). Moreover, the customer premise equipment 630 may include volatile memory 322 and/or non-volatile memory 324 in addition to a processor (e.g., to perform one or more computational tasks, such as processing received signals, etc.). Further, the customer premise equipment 630 may include a display 316 and/or a keypad 318 (e.g., for interacting with a user or operator).

Figure 7:
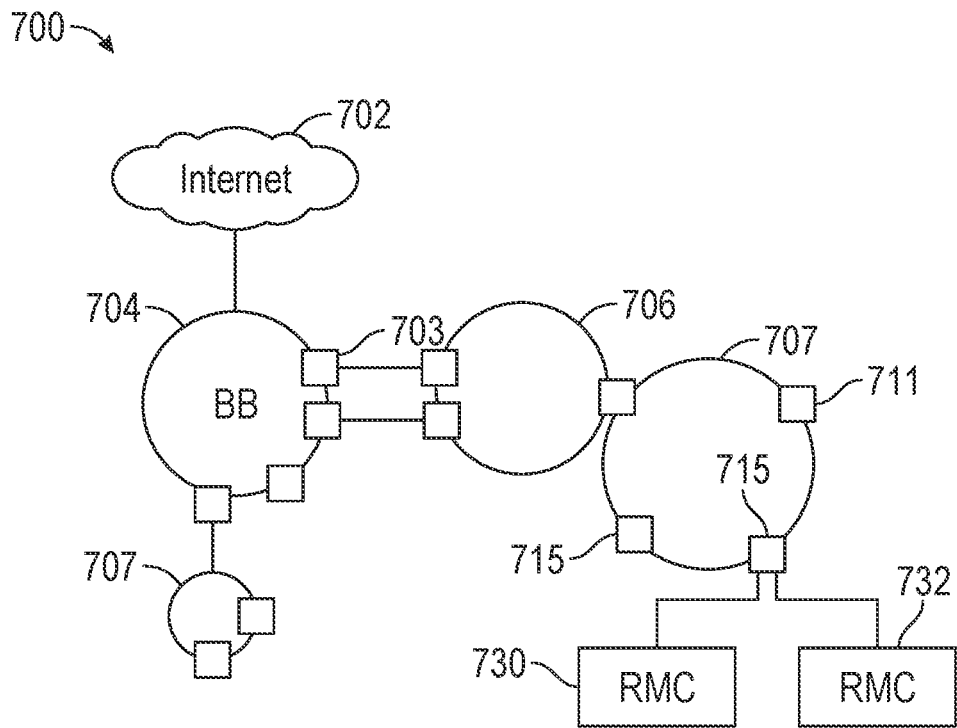
FIG. 7 shows an example diagram of a portion of a cable network, in accordance with example embodiments of the disclosure

FIG. 7 shows a diagram of an example distributed cable network, in accordance with example embodiments of the disclosure. In particular, the distributed cable network of diagram 700 illustrates a network environment which can be integrate with the disclosed remote MAC device architecture shown and described in connection with FIG. 6, above. In another embodiment, the Internet 702 may tie into multiple feeds 703 on a backbone ring network 704. Moreover, a given backbone ring network (e.g., backbone ring network 704) may feed data to multiple metropolitan networks (e.g., metropolitan ring networks 706 and/or 707). In another embodiment, the metro ring networks may tie into headend devices, for example, headend device 711 on a ring network topology 707. In another embodiment, the headend devices (e.g., similar to headend device 711) may feed a number of hubs or switches 715. Further, the hubs may feed down to the remote MAC devices 730 and 732 (e.g., at a switch 715, which may include, for example, a 24-port ethernet switch to feed 24 remote MAC devices, not shown).

Figure 8:
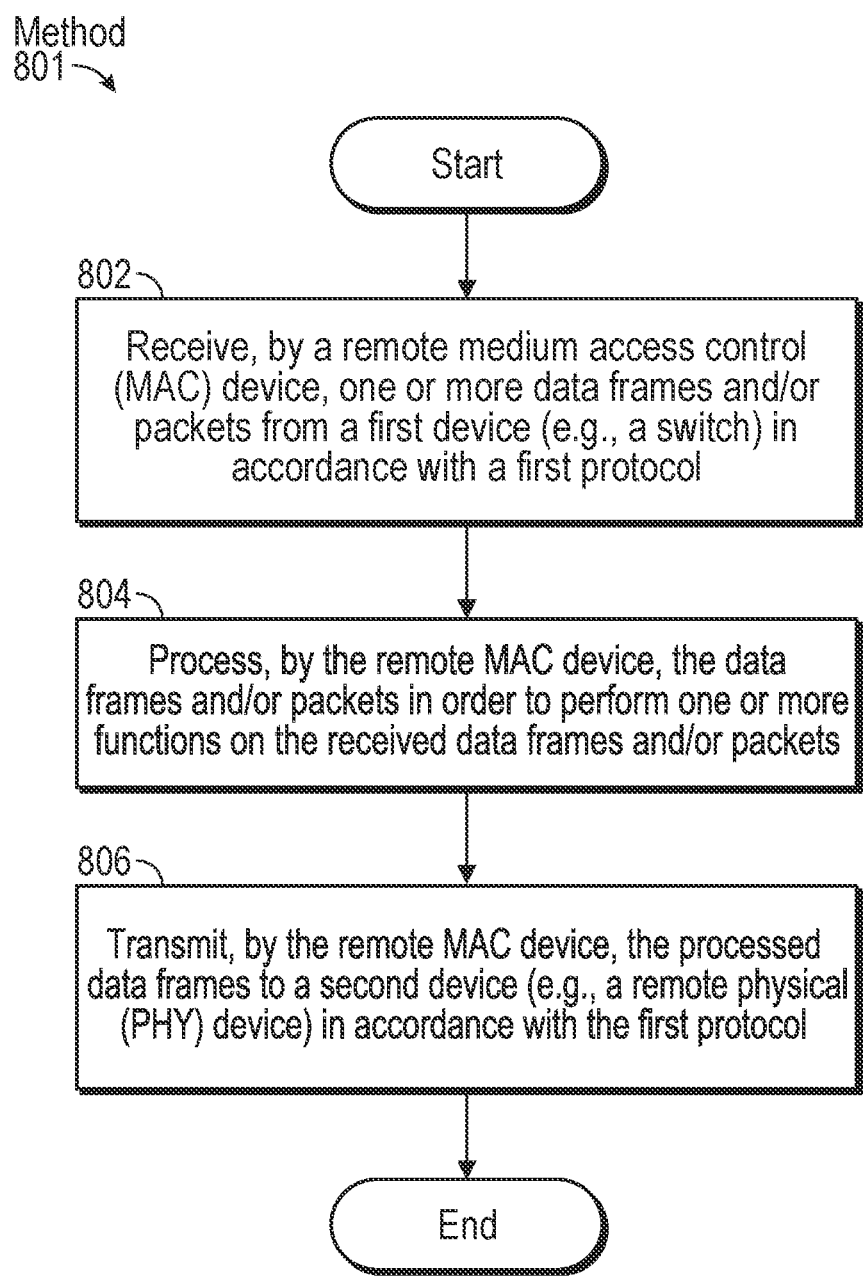
FIG. 8 shows a diagram of an example flowchart for operating example devices networks described herein, in accordance with example embodiments of the disclosure.

FIG. 8 shows a diagram of an example flowchart for operating example devices networks described herein, in accordance with example embodiments of the disclosure. In particular, FIG. 8 illustrates and example process 801 describing the downstream functionality of a remote MAC device (e.g., a remote MAC device 610 shown and described in connection with FIG. 6). The process 801 may begin with block 802, where the remote MAC device can receive one or more data frames and/or packets from a first device (for example a switch device, similar to switch 602 shown and described in connection with FIG. 6), in accordance with a first protocol (for example, a downstream protocol such DEPI). The process 801 may continue with block 804, where the remote MAC device can process the data frames and/or packets in order to perform various function (e.g., classify the data frames and/or packets into corresponding service flows (for example, using service flow IDs (SFIDs)), encapsulate data frames and/or packets (for example, into DOCSIS frames), determine routing information associated with the data frames and/or packets, determine resource allocation, scheduling, service flow, quality of service (QoS) on the data frames and/or packets. Finally, the process 801 may end with block 806, where the remote MAC device can transmit the processed data frames to a second device (for example a remote PHY device similar to remote PHY device 620 shown and described in connection with FIG. 6), for example, in one or more serialized streams, in accordance with a first protocol (for example, a downstream protocol such DEPI).

Figure 9:
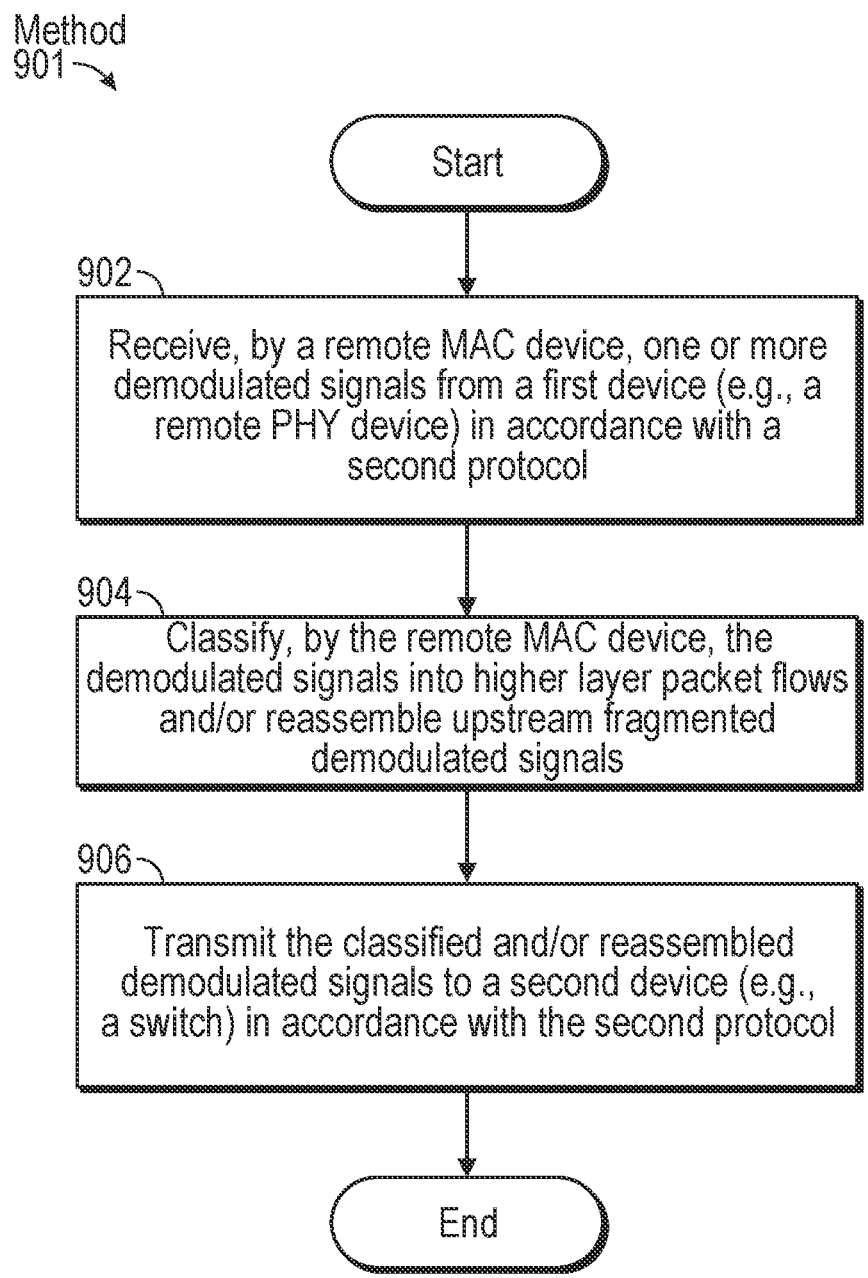
FIG. 9 shows another diagram of an example flowchart for operating example devices networks described herein, in accordance with example embodiments of the disclosure.

FIG. 9 shows another diagram of an example flowchart for operating example devices networks described herein, in accordance with example embodiments of the disclosure. In particular, FIG. 9 illustrates an example process 901 describing the upstream functionality of the remote MAC device (similar to the functionality of the remote MAC device 610, shown and described in connection with FIG. 6). The process 901 may begin with block 902, where the remote MAC device can receive one or more demodulated signals from a first device (for example a remote PHY device similar to the remote PHY device 620 shown and described in connection with FIG. 6), in accordance with a second protocol (for example, an upstream protocol such UEPI). The process 901 may continue with block 904, where the remote MAC device can classify demodulated signals into higher layer packet flows and/or reassemble upstream fragmented demodulated signals. Finally, the process 901 may end with block 906, where the remote MAC device can transmit the classified and/or reassembled demodulated signals to a second device (for example, a switch device such as switch device 602 shown and described in connection with FIG. 6), in accordance with a second protocol (for example, an upstream protocol such UEPI).

IV. ADDITIONAL IMPLEMENTATION DETAILS

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an implementation of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

V. CONCLUSION

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
   a switch configured to communicate with at least one remote medium access control (MAC) layer device over a first network connection;
   the at least one remote MAC layer device located between the switch and a remote physical (PHY) layer device, and configured to communicate with the first remote physical (PHY) layer device over a digital fiber connection using a downstream external PHY interface (DEPI) protocol or an upstream external PHY interface protocol (UEPI); and
   the first remote PHY layer device located between the remote MAC layer device and at least one customer premise equipment device, and configured to communicate with the at least one customer premise equipment device over an analog coaxial connection,
   wherein MAC layer functionality is absent from the PHY layer device,
   wherein the at least one remote MAC layer device is further configured to communicate with a second remote PHY layer device over the digital fiber connection,
   wherein a first distance between the switch and the remote MAC layer device is greater than a second distance between the remote MAC layer device and the remote PHY layer device.

2. The system of claim 1, wherein the at least one remote MAC layer device comprises an outside plant device.

3. The system of claim 1, wherein the at least one remote MAC layer device includes a virtual MAC layer functionality, and wherein the at least one remote MAC layer and the first remote PHY layer are located on a network cloud.

4. The system of claim 1, wherein the switch is further configured to communicate with a headend device on a metropolitan ring network.

5. The system of claim 1, wherein the first network connection comprises a digital fiber connection.

6. The system of claim 1, wherein a communication between the switch and the at least one remote MAC layer device over the first network connection comprises communication using an ethernet protocol.

7. The system of claim 1, wherein a distance between the at least one remote MAC layer device and the first remote PHY device comprises approximately 300 meters to approximately 10 kilometers.

8. The system of claim 1, wherein the system does not include a headend device.

9. The system of claim 1, wherein the remote MAC layer device may use a first amount of power regardless of a number of remote PHY layer devices communicating with the remote MAC layer device.

10. A remote medium access control (MAC) layer device comprising:
    a processor operably coupled to memory, the memory comprising computer-executable instructions that can be executed by processor to:
    communicate with a headend switch over a first network connection; and
    communicate with at least one remote physical (PHY) layer device over a digital fiber connection using a downstream external PHY interface (DEPI) protocol or an upstream external PHY interface protocol (UEPI),
    wherein MAC layer functionality is absent from the PHY layer device,
    wherein the remote MAC layer device is located between the switch and a remote physical (PHY) layer device,
    wherein the remote MAC layer device is further configured to communicate with a second remote PHY layer device over the digital fiber connection,
    wherein a first distance between the switch and the remote MAC layer device is greater than a second distance between the remote MAC layer device and the remote PHY layer device.

11. The remote MAC layer device of claim 10, wherein the remote MAC layer device includes a virtual MAC layer functionality, and wherein the remote MAC layer and the at least one remote PHY layer are located on a network cloud.

12. The remote MAC layer device of claim 10, wherein the first network connection comprises a digital fiber connection.

13. The remote MAC layer device of claim 10, wherein a communication between the remote MAC layer device and the switch over the first network connection comprises communication using an ethernet protocol.

14. The remote MAC layer device of claim 13, wherein the ethernet protocol includes a 10 gigabit ethernet protocol.

15. A computer-implemented method, comprising:
receiving a first signal, by a processor of a remote MAC layer device located between the switch and a remote physical (PHY) layer device, from a headend switch using an ethernet protocol; and
transmitting over a digital fiber connection using a downstream external PHY interface (DEPI) protocol or an upstream external PHY interface protocol (UEPI) a second signal, by the processor, to at least one remote PHY layer device located between the remote MAC layer device and at least one customer premise equipment device, the second signal based on processing the first signal, wherein MAC layer functionality is absent from the remote PHY layer device,
wherein the at least one remote MAC layer device is further configured to communicate with a second remote PHY layer device over the digital fiber connection,
wherein a first distance between the switch and the remote MAC layer device is greater than a second distance between the remote MAC layer device and the remote PHY layer device.

16. The computer-implemented method of claim 15, wherein the transmitting of the second signal between the remote MAC layer device and the at least one remote PHY device comprises transmitting the second signal using a downstream external PHY interface (DEPI) protocol.

\* \* \* \* \*